US009347369B2

(12) United States Patent
Herbruck et al.

(10) Patent No.: US 9,347,369 B2
(45) Date of Patent: May 24, 2016

(54) SYSTEMS AND METHODS FOR CONTROLLING COMPRESSION IN AN ENGINE, COMPRESSOR, OR PUMP

(71) Applicant: GoTek Energy, Inc., Oak View, CA (US)

(72) Inventors: Steven Lee Herbruck, Ojai, CA (US); Bradley Scott Farrenkopf, Moorpark, CA (US)

(73) Assignee: GoTek Energy, Inc., Oak View, CA (US)

( * ) Notice: Subject to any disclaimer, the term of this patent is extended or adjusted under 35 U.S.C. 154(b) by 487 days.

(21) Appl. No.: 13/843,560

(22) Filed: Mar. 15, 2013

(65) Prior Publication Data
US 2014/0261324 A1 Sep. 18, 2014

(51) Int. Cl.
F02M 69/00 (2006.01)
F02B 53/00 (2006.01)
F02B 55/08 (2006.01)
F02B 55/16 (2006.01)

(52) U.S. Cl.
CPC ............... *F02B 53/00* (2013.01); *F02B 55/08* (2013.01); *F02B 55/16* (2013.01)

(58) Field of Classification Search
CPC ........ F02M 69/00; F02M 69/044; F02D 1/00; F02B 2053/005; F02B 53/02; F02B 3/00; F02B 53/08; F01C 1/084; F01C 1/086; F01C 1/22; F01C 1/24; F01C 17/02; F01C 17/00; F01C 17/04; F01C 20/16
USPC ......... 123/316, 445, 200, 202, 205, 207–210, 123/212, 214; 251/30.01
See application file for complete search history.

(56) References Cited

U.S. PATENT DOCUMENTS

| 3,919,986 | A | | 11/1975 | Goto | |
|---|---|---|---|---|---|
| 4,169,451 | A | * | 10/1979 | Niggemeyer | F02B 53/08 123/202 |
| 4,442,809 | A | | 4/1984 | Nohira et al. | |
| 4,538,569 | A | * | 9/1985 | Sugino et al. | 123/316 |
| 4,829,958 | A | | 5/1989 | Duret | |
| 5,168,846 | A | * | 12/1992 | Paul | F01C 20/16 123/202 |
| 5,277,158 | A | | 1/1994 | Pangman | |
| 5,345,905 | A | | 9/1994 | Edwards | |
| 7,143,737 | B2 | | 12/2006 | Kim | |
| 7,500,462 | B2 | | 3/2009 | Karnes | |

(Continued)

FOREIGN PATENT DOCUMENTS

WO 8100739 A1 3/1981

OTHER PUBLICATIONS

International Search Report and Written Opinion of International Application No. PCT/US14/18213; Jun. 17, 2014; 26 pages.

*Primary Examiner* — Stephen K Cronin
*Assistant Examiner* — Xiao Mo
(74) *Attorney, Agent, or Firm* — Armstrong Teasdale LLP

(57) ABSTRACT

A housing for an engine is provided. The housing includes an intake manifold configured to supply air to at least one chamber defined within the housing, a fuel port configured to supply fuel to the at least one chamber, and a compression control port configured to control at least one of a pressure and a volume of a fuel-air mixture in the at least one chamber during a compression cycle of the engine. The compression control port includes a passage defined through the housing, and at least one valve disposed in the passage and configured to control a flow through the passage.

26 Claims, 5 Drawing Sheets

(56) References Cited

U.S. PATENT DOCUMENTS

| | | |
|---|---|---|
| 8,297,252 B1 | 10/2012 | Landin |
| 2007/0272200 A1* | 11/2007 | Kamimura ............. F02B 19/04 123/261 |
| 2010/0224804 A1* | 9/2010 | Sneh .......................... 251/30.01 |
| 2011/0139116 A1 | 6/2011 | Herbruck |
| 2011/0142702 A1 | 6/2011 | Pekrul |

* cited by examiner

SYSTEMS AND METHODS FOR CONTROLLING COMPRESSION IN AN ENGINE, COMPRESSOR, OR PUMP

BACKGROUND

The present application relates generally to engines, compressors, or pumps and, more particularly, to controlling operating conditions of engines using a compression control port.

Internal combustion engines burn fuel in their combustion chambers in the presence of oxygen (usually from air) to generate high temperature and pressure gases, which expand and apply force against movable engine parts to rotate a shaft. Movement of this shaft produces rotational mechanical energy. Thus, an internal combustion engine converts potential chemical energy in the fuel into kinetic mechanical energy. Therefore, they provide the power for practical mechanical work to move various forms of land, water, and air transportation, run pumps, and drive other equipment.

In at least some known combustion engines, an intake port supplies gas into a chamber, and pressure is generated after the intake port is closed or blocked off by compression created by mechanical movement of internal parts of the engine. In at least some known combustion engines, the final pressure is controlled by minimizing the final compressed volume, maximizing the initial uncompressed volume, and/or maximizing the initial uncompressed pressure. Maximum compressed pressure is fixed in at least some known engines from engine design. Although some new engine concepts vary stroke dynamically, they typically require complex mechanical methods. Further, without significant design modifications, at least some known engines operate on limited types of fuel.

BRIEF DESCRIPTION

In one aspect, a housing for an engine is provided. The housing includes an intake manifold configured to supply air to at least one chamber defined within the housing, a fuel port configured to supply fuel to the at least one chamber, and a compression control port configured to control at least one of a pressure and a volume of a fuel-air mixture in the at least one chamber during a compression cycle of the engine. The compression control port includes a passage defined through the housing, and at least one valve disposed in the passage and configured to control a flow through the passage.

In another aspect, an engine is provided. The engine includes an air intake system configured to supply air to at least one chamber, a fuel injection system configured to inject fuel into the at least one chamber, and a housing, wherein the at least one chamber is defined within the housing, the housing including a compression control port configured to control at least one of a pressure and a volume of a fuel-air mixture in the at least one chamber during a compression cycle of the engine. The compression control port includes a passage defined through the housing, and at least one valve disposed in the passage and configured to control a flow through the passage. The engine further includes an exhaust system configured to discharge exhaust from the at least one chamber.

In yet another aspect, a method for operating an engine is provided. The method includes supplying air into at least one chamber, injecting fuel into the at least one chamber, compressing the fuel-air mixture during a compression cycle, and controlling at least one of a volume and a pressure of the fuel-air mixture during the compression cycle using a compression control port, the compression control port including a passage in flow communication with the at least one chamber, and at least one valve disposed in the passage and configured to control a flow through the passage. The method further includes combusting the compressed fuel-air mixture, and discharging exhaust from the at least one chamber.

DETAILED DESCRIPTION

The embodiments described herein provide a compression control port for controlling the pressure and/or volume inside a combustion engine prior to and/or during a compression cycle. The compression control port includes one or more valves to bleed-off or blow-off compression during operation of the combustion engine. The one or more valves may be controlled by an engine control module.

Figure 1:
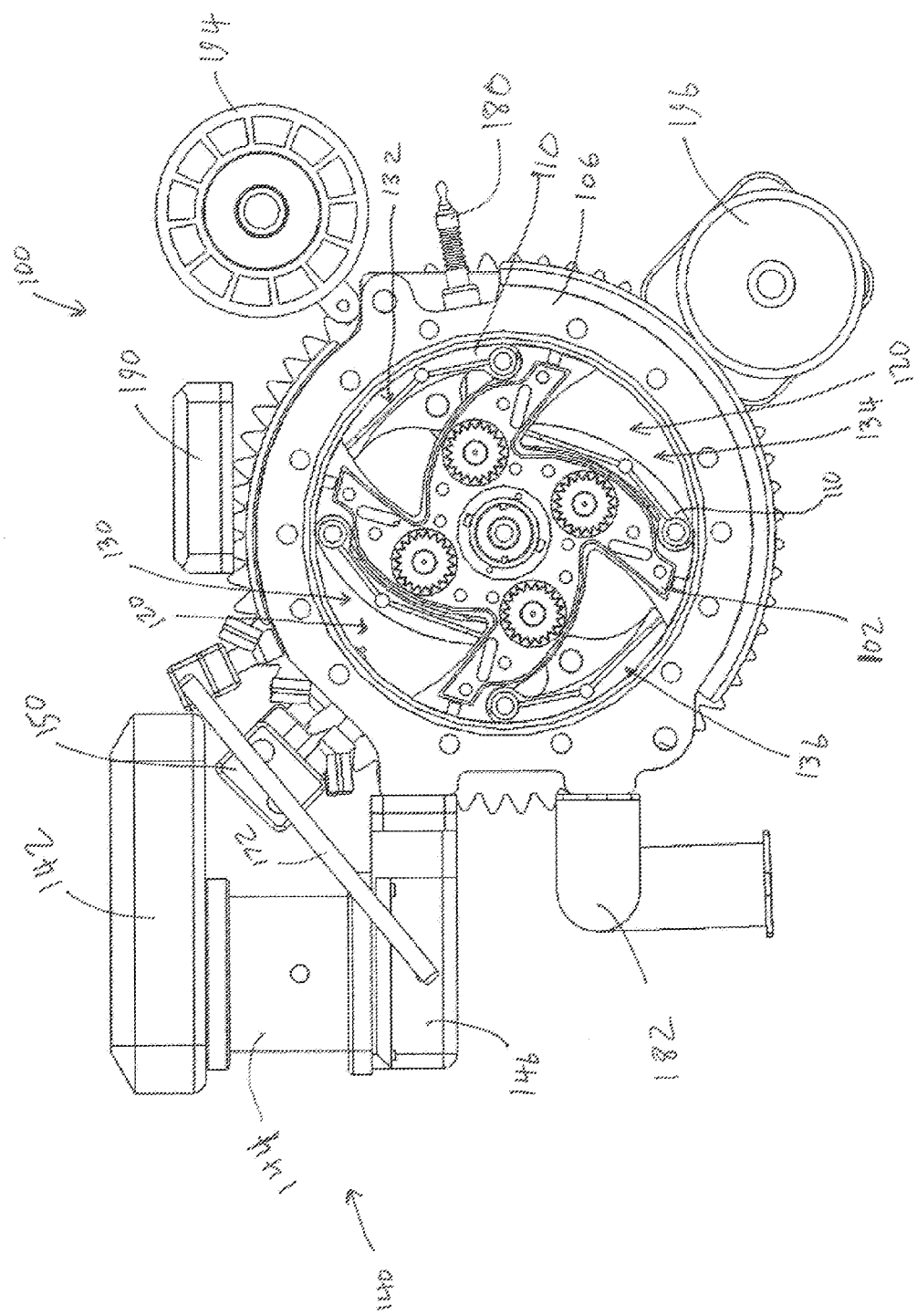
FIG. 1 is a front view of an exemplary rotary engine.
Figure 2:
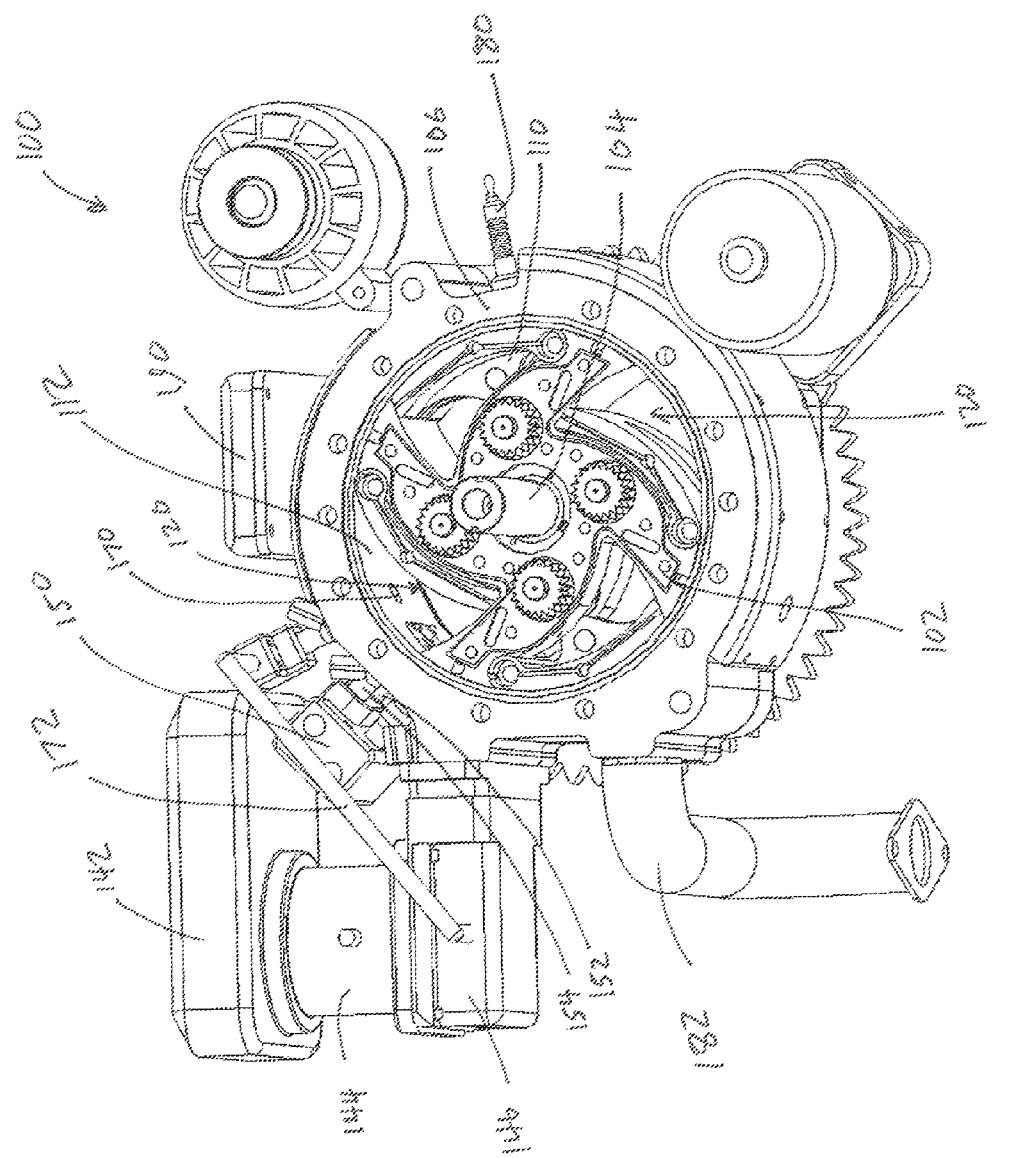
FIG. 2 is a perspective view of the rotary engine shown in FIG. 1.

FIG. 1 is a front view of an exemplary rotary engine 100. FIG. 2 is a perspective view of rotary engine 100. Rotary engine 100 includes a rotor 102 that rotates about a main crankshaft 104 within a housing 106. In some embodiments, an interior sleeve (not shown) may be fit within housing 106 to provide a replaceable long wearing component for housing 106. Accordingly, as used herein, the term "housing" may refer to a unitary housing, or a combined housing and sleeve assembly. Rotor 102 includes a plurality of pivot pistons 110, or rockers. As rotor 102 rotates about main crankshaft 104, pistons 110 pivot between an outer position close to an inner surface 112 of housing 106 and an inner position away from inner surface 112 and near main crankshaft 104. In FIGS. 1 and 2, two pivot pistons 110 are at the outer position and two pivot pistons 110 are at the inner position. Rotor 102 and pivot pistons 110 operate substantially similar to those disclosed in U.S. patent application Ser. No. 12/637,595, filed Dec. 14, 2009, which is hereby incorporated by reference in its entirety.

In the exemplary embodiment, rotor 102 defines four chambers 120 within housing 106, with each chamber 120 including a pivot piston 110. Alternatively, rotor 102 defines any number of chambers 120 within housing that enables rotary engine 100 to function as described herein. During a complete cycle of rotary engine 100, chambers 120 rotate through an intake zone 130, a compression zone 132, a power zone 134, and an exhaust zone 136. An intake cycle, a compression cycle, a combustion/power cycle, and an exhaust cycle each occur in the associated zone.

In intake zone 130, fuel and air are supplied to chamber 120, and pivot piston 110 is positioned at the inner position. In the exemplary embodiment, air flows into chamber 120 from an air intake system 140 that includes an air filter 142, a throttle body 144, and an intake manifold 146 that extends through housing 106. Alternatively, any fluid that enables rotary engine 100 to function as described herein may be supplied to chamber 120. A fuel injector 150 injects fuel into chamber 120. The fuel may be atomized before compression and/or may be injected at a pressure higher that an initial pressure of chamber 120. Rotary engine 100 may be designed to burn a plurality of different fuels (e.g., gasoline, ethanol, diesel, CNG, LNG, propane, and/or hydrogen). Accordingly, fuel injector 150 may include separate outlets 152, 154 for injecting different fuels into chamber 120.

As chamber 120 rotates from intake zone 130 into compression zone 132, the fuel-air mixture in chamber 120 is compressed as pivot piston 110 translates from the inner position to the outer position. A compression control port 170 is defined through housing 106 at intake zone 130. In embodiments including an interior sleeve, compression control port 170 is also defined through the sleeve. As described in detail below, compression control port 170 facilitates precisely controlling a pressure and/or volume of the fuel-air mixture as chamber 120 rotates between intake zone 130 and compression zone 132. During operation, a fluid or gas (e.g., air and/or fuel) flows through compression relief port to intake manifold 146 through a return conduit 172. That is, return conduit 172 is in fluid or gas communication with compression control port 170 and intake manifold 146. Although only one compression control port 170 is shown in the exemplary embodiment, alternatively, any number of compression control ports 170 may be used that enable rotary engine 100 to function as described herein.

As chamber 120 rotates from compression zone 132 to power zone 134, pivot piston 110 pivots from the outer position to the inner position, and a spark plug 180 fires to combust the fuel-air mixture. The combustion generated by spark plug 180 drives rotation of rotor 102 about main crankshaft 104. As chamber 120 rotates from power zone 134 to exhaust zone 136, pivot piston 110 translates from the inner position to the outer position, and exhaust from chamber 120 flows out through an exhaust manifold 182 that extends through housing 106 into an exhaust system (not shown).

In the exemplary embodiment, rotary engine 100 includes an engine control module (ECM) 190 attached to housing 106. ECM 190 facilitates controlling the pressure and/or volume of the fuel-air mixture as chamber 120 rotates between intake zone 130 and compression zone 132 by controlling flow through compression control port 170, as described in detail below. Rotary engine 100 also includes an alternator 194 and a starter motor 196 attached to housing 106 in the exemplary embodiment.

Figure 3:
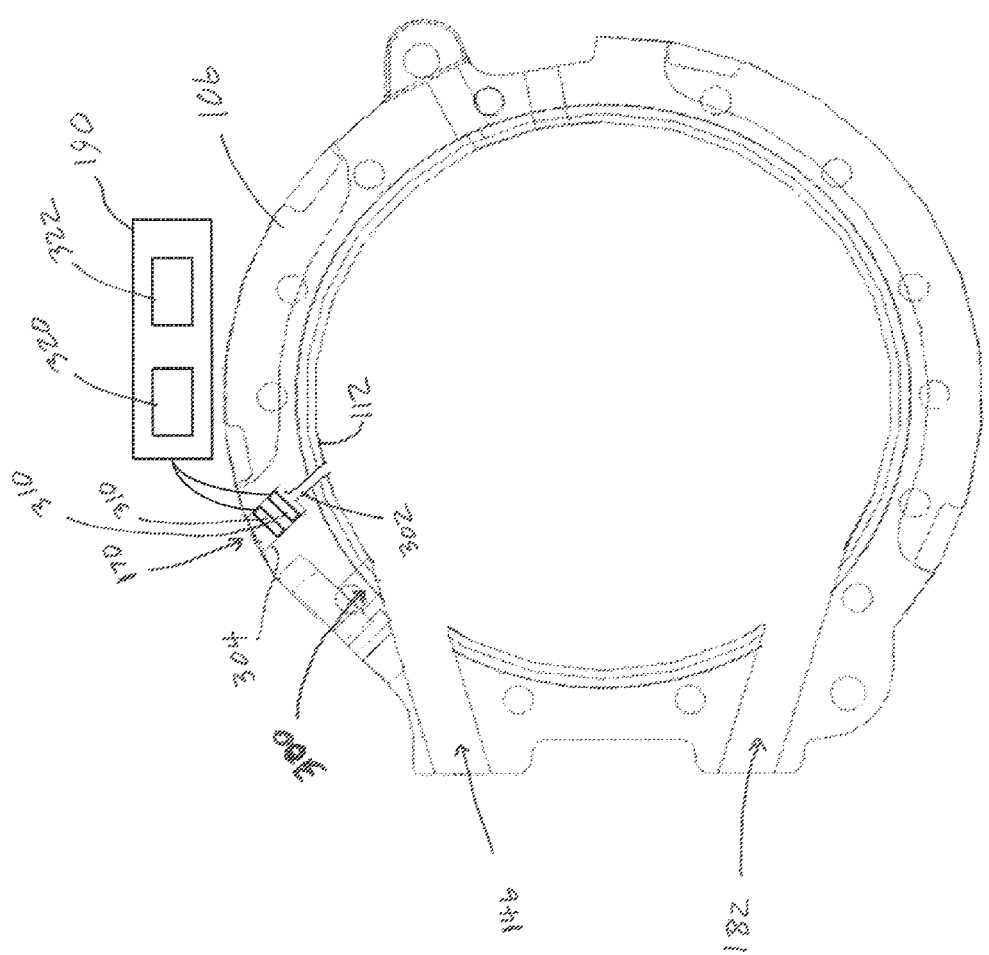
FIG. 3 is a schematic view of an exemplary housing and engine control module that may be used with the rotary engine shown in FIG. 1.
Figure 4:
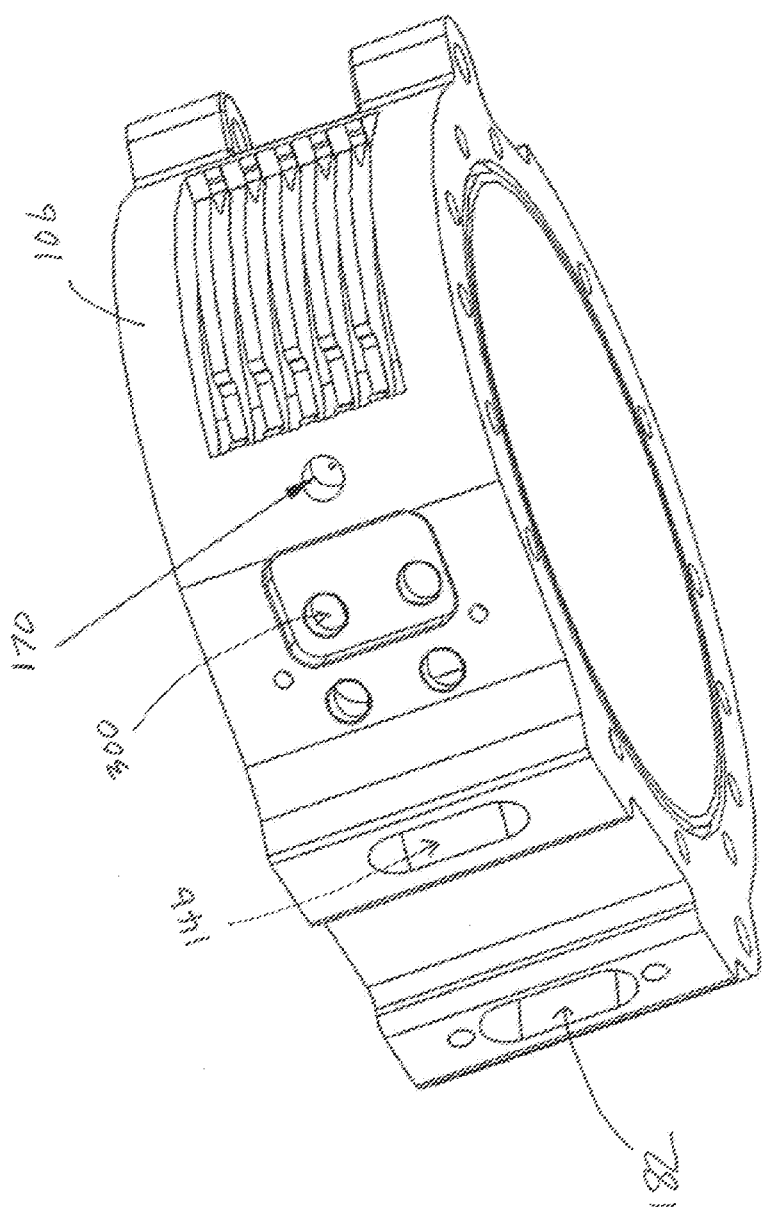
FIG. 4 is a perspective view of the housing shown in FIG. 3.

FIG. 3 is a schematic view of housing 106 and ECM 190. FIG. 4 is a perspective view of housing 106. As described above, housing 106 includes intake manifold 146, exhaust manifold 182, and compression control port 170. Housing 106 includes at least one fuel injection port 300 for supplying fuel to chamber 120 from, for example, fuel injector 150.

In the exemplary embodiment, compression control port 170 includes a first passage 302 and a second passage 304 that is in fluid or gas communication with and wider than first passage 302. Compression control port 170 further includes at least one valve 310 that controls a flow through first and second passages 302 and 304. In the exemplary embodiment, compression control port 170 includes two valves 310 positioned within second passage 304. Using at least two valves 310 facilitates reducing the likelihood of a leak valve failure, as an unintended leak through one valve 310 will be prevented from causing unintended consequences by the second, redundant valve 310. Alternatively, compression control port 170 includes any number of valves 310 that enable compression control port 170 to function as described herein. Further, in an alternative embodiment, at least one valve 310 may be positioned within first passage 302. Moreover, valves 310 may be controlled electronically, pneumatically, hydraulically, and/or mechanically.

In the exemplary embodiment, each valve 310 is one of a real-time electrically adapting valve, an electrically settable valve, and a mechanically settable valve. Each of these valve types are described herein. Alternatively, valves 310 may be any type of valve device that enables compression control port 170 to function as described herein.

When valve 310 is a real-time electrically adapting valve or an electrically settable valve, valve 310 is controlled using ECM 190. In the exemplary embodiment, ECM 190 includes a processor 320 and a memory device 322 communicatively coupled to processor 320. Processor 320 includes any suitable programmable circuit which may include one or more systems and microcontrollers, microprocessors, reduced instruction set circuits (RISC), application specific integrated circuits (ASIC), programmable logic circuits (PLC), field programmable gate arrays (FPGA), and any other circuit capable of executing the functions described herein. The above examples are exemplary only, and thus are not intended to limit in any way the definition and/or meaning of the term "processor." Memory device 322 includes a computer readable medium, such as, without limitation, random access memory (RAM), flash memory, a hard disk drive, a solid state drive, a diskette, a flash drive, a compact disc, a digital video disc, and/or any suitable device that enables processor 320 to store, retrieve, and/or execute instructions and/or data. In some embodiments, ECM 190 may include additional components. For example, ECM 190 may include a communication interface (not shown) for communicating with one or more remote devices, a presentation interface (not shown) for displaying information to a user, and/or a user input interface (not shown) for receiving input from a user.

As chamber 120 rotates from intake zone 130 into compression zone 132, the fuel-air mixture in chamber 120 is compressed, as described above. Specifically, during the compression cycle, a gas (i.e., the fuel-air mixture) begins at an initial volume, V_maxchamber, and an initial pressure, P_intake. The volume of the gas is reduced to a final volume, V_minchamber, causing it to achieve a higher final pressure, P_final, where (P_intake)*(V_maxchamber)=(P_final)*(V_minchamber). As described herein, P_final may be controlled by reducing V_maxchamber before and/or during compression using a real-time electrically adapting valve or an electrically settable valve, or relieving P_final to a lower pressure before and/or during the combustion cycle using a mechanically settable valve. The real-time electrically adapting valve, the electrically settable valve, or the mechanically settable valve each provide a low restriction flow path via compression control port 170 prior to and/or during the compression cycle.

For both the real-time electrically adapting valve and the electrically settable valve, a bleed-off of the compression through compression control port 170 occurs to maintain the pressure in chamber 120 at P_intake while the volume in chamber 120 is decreased (e.g., by pivot piston 110 pivoting from inner position to outer position) to a desired value of V_maxchamber. For the mechanically settable valve, a blow-off of the compression through compression control port 170 occurs as the compression cycle reaches completion, such that the pressure in chamber 120 drops from a maximum possible pressure to a desired value of P_final. The bleed-off or blow-off is directed back to intake manifold 146 through return conduit 172. Providing a closed-loop system with return conduit 172 ensures that a potentially explosive fuel-air mixture is not released into the atmosphere.

In the exemplary embodiment, for both the real-time electrically adapting valve and the electrically settable valve, valve 310 is an electrical solenoid poppet valve and/or a stepper valve. ECM 190 is communicatively coupled to poppet valve 310 such that ECM 190 can control whether valve 310 is in an open state (allowing bleed-off through compression control port 170) or a closed state (preventing bleed-off through compression control port 170). When ECM 190 is communicatively coupled to a stepper valve, ECM 190 will control volume and/or pressure without fluctuations or bounce.

In the exemplary embodiment, ECM 190 receives an input from a crank position sensor (not shown) that provides a direct indication of a position of rotor 102 and/or pivot piston 110. ECM 190 may also be communicatively coupled to receive inputs from additional sensors, such as a knock sensor.

For the real-time electrically adapting valve, poppet and/or stepper valve 310 is controlled by ECM 190 based on the crank position sensor input and at least one other sensor input or parameter. For example ECM 190 may control poppet valve 310 based at least in part on a sensor input from a knock sensor. Specifically, ECM 190 controls poppet valve 310 to remain open as the compression cycle starts, maintaining P_intake in chamber 120 until a calculated valve closing point is reached. The valve closing point is calculated from the crank position sensor input and the at least one other sensor input or parameter, and the valve closing point determines V_maxchamber for the compression cycle. With P_intake set constant and V_minchamber set constant based upon the design of rotary engine 100, P_final can be controlled by controlling V_maxchamber.

For the electrically settable valve, poppet valve 310 is controlled by ECM 190 based only on the crank position sensor input. Specifically, ECM 190 controls poppet valve 310 to remain open as the compression cycle starts, maintaining P_intake in chamber 120 until a calculated valve closing point is reached. The valve closing point is calculated from the crank position sensor input based upon a calibration of ECM 190 related to crank position, and the valve closing point sets V_maxchamber for the compression cycle. Similar to the real-time electrically adapting valve, with P_intake set constant and V_minchamber set constant based upon the design of rotary engine 100, P_final can be controlled by controlling V_maxchamber.

In the exemplary embodiment, for the mechanically settable valve, valve 310 is a deflective disk valve that acts as a pressure regulator. Deflective disk valve 310 opens when a maximum relief pressure is reached in the chamber, allowing blow-off through compression control port 170. That is, starting at the beginning of the compression cycle, deflective disk valve 310 remains closed until the pressure in chamber 120 reaches a blow-off level that causes deflective disk valve 310 to open. The blow-off level is set based on the physical characteristics of valve 310, and may be set by adjusting, for example, a coil spring, a deflective disk preload, or a sized orifice of valve 310. The blow-off level corresponds to a desired value of P_final in chamber 120. Specifically, if the pressure in chamber 120 exceeds the blow-off level, deflective disk valve 310 will allow blow-off through compression control port 170 and reduce the pressure until the pressure drops below the blow-off level, causing deflective disk valve 310 to close.

Using compression control port 170, rotary engine 100 can be configured relatively quickly to operate using different fuel types. Specifically, different fuel types may use different operating conditions (i.e., pressure and volume in chamber 120). By adjusting the valve close point (for real-time electrically adapting valves and electrically settable valves) or adjusting the blow-off level (for mechanically settable valves), the operating conditions (i.e., pressure and volume in chamber 120) of rotary engine 100 can be precisely controlled without manipulating the design of rotary engine 100 (e.g., without piston rod or crankshaft changes). For example, in one embodiment, ECM 190 may include a plurality of preset valve close points stored in memory device 322, with each present valve close point associated with a different fuel type. The preset valve close points may be selectable, using, for example, a user input interface, such that rotary engine 100 can quickly be switched between operating modes that use different fuel types.

Figure 5:
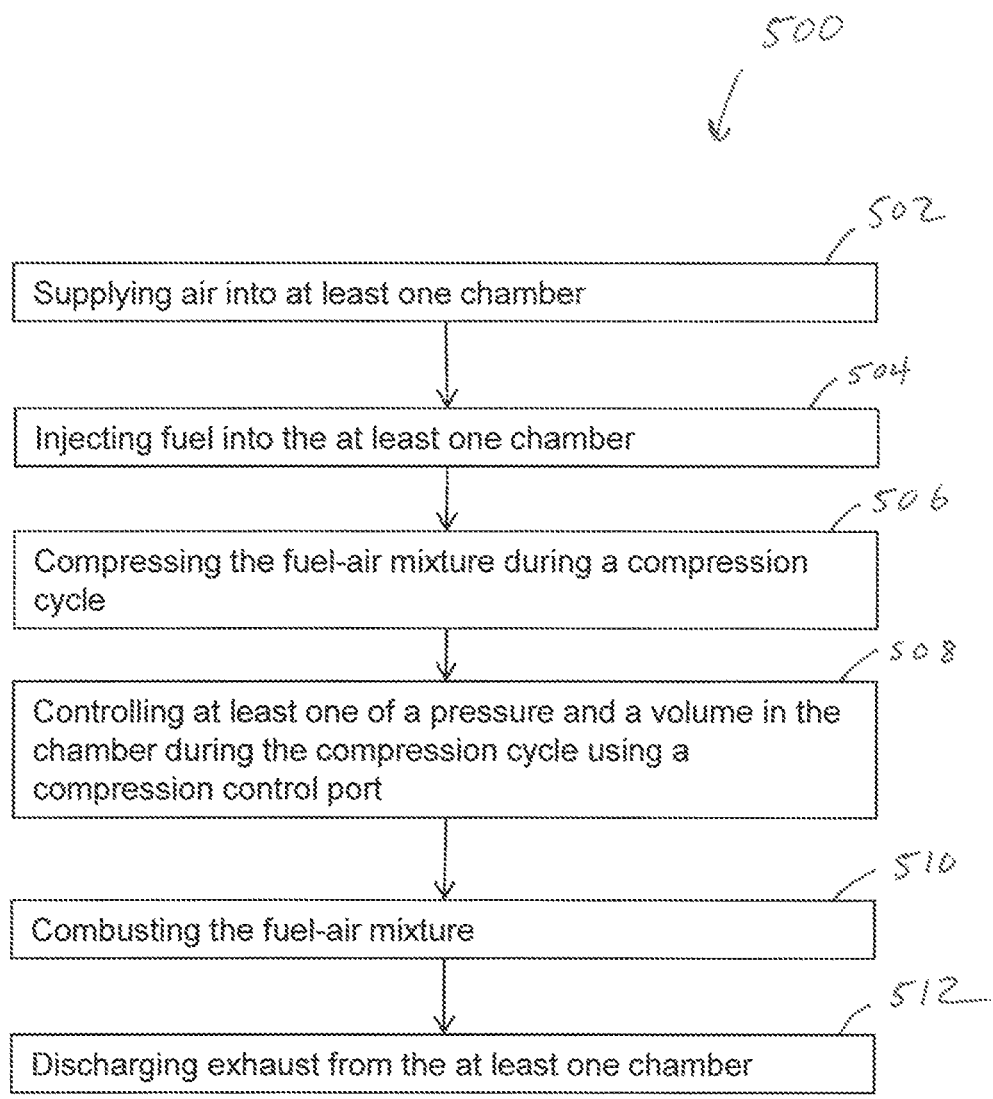
FIG. 5 is a flowchart of an exemplary method for operating a combustion engine.

FIG. 5 is a flow diagram of an exemplary method 500 that may be used with rotary engine 100. Method 500 includes supplying 502 air into at least one chamber, such as chamber 120 (shown in FIGS. 1 and 2). Air may be supplied 502 using an air intake system, such as air intake system 140 (shown in FIGS. 1 and 2). Fuel is injected 504 into the at least one chamber using, for example, a fuel injector, such as fuel injector 150 (shown in FIGS. 1 and 2). The fuel-air mixture in the chamber is compressed 506 during a compression cycle. The mixture may be compressed 506 using a piston, such as pivot piston 110 (shown in FIGS. 1 and 2). During the compression cycle, at least one of a volume and a pressure of the fuel-air mixture is controlled 508 using a compression control port, such as compression control port 170 (shown in FIGS. 1-4). The compressed fuel-air mixture is combusted 510, and exhaust is discharged 512 from the at least one chamber.

The systems and methods described herein provide a compression control port for controlling the pressure and/or volume inside a combustion engine prior to and/or during a compression cycle. The compression control port includes one or more valves to bleed-off, blow-off, or otherwise control compression during operation of the combustion engine. The one or more valves may be controlled by an engine control module.

As compared to at least some known engines, the systems and methods described herein include a compression control port that facilitates controlling compression during operation of an engine. Further, unlike at least some known engines that may operate using only limited fuel types, the systems and methods described herein facilitate adjusting an engine relatively quickly such that the engine can quickly be configured to operate for use with a variety of fuel types such as gasoline, diesel, etc. Using the compression control port and the ECM described herein, in some embodiments, engines may operate at significantly lower compression ratios (e.g., up to four to one for lower) during relaxed conditions, may operate at significantly higher compression ratios (e.g., up to thirty to one for higher) when extra power is desired, and may operate using a much leaner air to fuel ratio (e.g., seventeen to one leaner) that at least some known combustion engines.

Although the embodiments specifically described herein are implemented in one type of rotary engine, those of skill in the art will appreciate the methods and systems described herein may be implemented in a variety of types of engines and pumps, including, for example, a Wankel engine. For implementations in a pump, the systems and methods described herein may be utilized to control flow out of an outlet. Further, engines with multiple compression cycles may include multiple compression control ports. For example, a compression control port may be applied to each cylinder of a piston engine. In another example a rotary engine with two compression cycles may include two corresponding compression control ports.

Exemplary embodiments are described above in detail. The systems and methods disclosed are not limited to the specific embodiments described herein, but rather, components of the charging device and/or system and/or steps of the method may be utilized independently and separately from other components and/or steps described herein.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A housing for an engine, said housing comprising:
   a cylindrical inner wall configured to engage a rotor that rotates within said housing;
   an intake manifold configured to supply air to at least one chamber, the at least one chamber defined within said housing and at least partially by the rotor;
   a fuel port configured to supply fuel to the at least one chamber; and
   a compression control port configured to control at least one of a pressure and a volume of a fuel-air mixture in the at least one chamber as the at least one chamber rotates around said housing during a compression cycle of the engine, said compression control port comprising:
   a passage defined through said housing; and
   at least one valve disposed in said passage and configured to control a flow through said passage.

2. A housing in accordance with claim 1, wherein said housing further comprises a return conduit providing gas or fluid communication between said intake manifold and said passage.

3. A housing in accordance with claim 1, wherein said at least one valve is a valve configured to be controlled by an engine control module.

4. A housing in accordance with claim 3, wherein said at least one valve is one of an electrical solenoid poppet valve and a stepper electric motor controlled valve.

5. A housing in accordance with claim 3, wherein said at least one valve is a real-time electrically adapting valve configured to be controlled by the engine control module based on a first input from a crank position sensor of the engine and a second input from at least one additional sensor.

6. A housing in accordance with claim 3, wherein said at least one valve is an electrically settable valve configured to be controlled by the engine control module based solely on an input from a crank position sensor of the engine.

7. A housing in accordance with claim 3, wherein said at least one valve is configured to be controlled such that said at least one valve remains open during the compression cycle until a calculated valve closing point is reached.

8. A housing in accordance with claim 1, wherein said at least one valve is a mechanically settable valve configured to open when the pressure in the at least one chamber reaches a blow-off level.

9. A housing in accordance with claim 8, wherein said at least one valve is a deflective disk valve.

10. An engine comprising:
    an air intake system configured to supply air to at least one chamber;
    a fuel injection system configured to inject fuel into the at least one chamber;
    a housing;
    a rotor configured to rotate about a rotational axis within said housing, wherein the at least one chamber is defined within said housing and at least partially by said rotor, wherein said housing comprises a compression control port configured to control at least one of a pressure and a volume of a fuel-air mixture in the at least one chamber as the at least one chamber rotates around said housing during a compression cycle of the engine, said compression control port comprising:
    a passage defined through said housing; and
    at least one valve disposed in said passage and configured to control a flow through said passage; and
    an exhaust system configured to discharge exhaust from the at least one chamber.

11. An engine in accordance with claim 10, further comprising an engine control module communicatively coupled to said at least one valve, said engine control module configured to switch said at least one valve between an open state and a closed state.

12. An engine according to claim 11, wherein said engine control module is configured to switch said at least one valve between an open state and a closed state based on a first input from a crank position sensor of the engine and a second input from at least one additional sensor.

13. An engine according to claim 11, wherein said engine control module is configured to switch said at least one valve between an open state and a closed state based solely on an input from a crank position sensor of the engine.

14. An engine according to claim 10, further comprising a return conduit providing gas or fluid communication between said passage and said air intake system.

15. An engine according to claim 10, wherein said at least one valve is a mechanically settable valve configured to open when the pressure in the at least one chamber reaches a blow-off level.

16. A method for operating an engine, said method comprising:
    providing a rotor within a housing such that at least one chamber is defined within the housing and at least partially by the rotor;
    supplying air into the at least one chamber;
    injecting fuel into the at least one chamber;
    compressing the fuel-air mixture during a compression cycle;
    controlling at least one of a volume and a pressure of the fuel-air mixture as the at least one chamber rotates around the housing during the compression cycle using a compression control port, the compression control port including a passage in flow communication with the at least one chamber, and at least one valve disposed in the passage and configured to control a flow through the passage;
    combusting the compressed fuel-air mixture; and
    discharging exhaust from the at least one chamber.

17. A method in accordance with claim 16, wherein controlling at least one of a volume and a pressure comprises switching the at least one valve between an open state and a closed state using an engine control module communicatively coupled to the at least one valve.

18. A method in accordance with claim 17, wherein switching the at least one valve comprises switching the at least one valve based on a first input from a crank position sensor of the engine and a second input from at least one additional sensor.

19. A method in accordance with claim 17, wherein switching the at least one valve comprises switching the at least one valve based solely on an input from a crank position sensor of the engine.

20. A method in accordance with claim 16, wherein controlling at least one of a volume and a pressure comprises opening the at least one valve when the pressure reaches a blow-off level in the at least one chamber.

21. An engine in accordance with claim 10, wherein the at least one chamber includes a plurality of chambers defined within said housing and at least partially by said rotor, and wherein said compression control port is configured to control at least one of a pressure and a volume of a fuel-air mixture in each chamber of the plurality of chambers as each chamber rotates around said housing.

22. An engine in accordance with claim 10, wherein said housing includes a cylindrical inner surface, the passage extending radially outward from said inner surface, wherein said at least one valve is disposed radially outward from said inner surface.

23. A rotary engine comprising:
    an air intake system configured to supply air to at least one chamber;
    a fuel injection system configured to inject fuel into the at least one chamber;
    an exhaust system configured to discharge exhaust from the at least one chamber;
    a housing; and
    a rotor configured to rotate about a rotational axis within said housing, wherein the at least one chamber is defined within said housing and at least partially by said rotor, wherein said housing comprises a compression control port configured to control at least one of a pressure and a volume of a gaseous mixture in the at least one chamber as the at least one chamber rotates around said housing during a compression cycle of the engine, said compression control port comprising:
    a passage defined through said housing; and
    at least one valve disposed in said passage and configured to control a flow through said passage.

24. A rotary engine according to claim 23, wherein said fuel injection system is configured to inject fuel into the at least one chamber prior to the compression cycle of the engine.

25. A method for operating a rotary engine, said method comprising:
    providing a rotor within a housing such that at least one chamber is defined within the housing and at least partially by the rotor;
    supplying air into the at least one chamber;
    injecting fuel into the at least one chamber;
    compressing a gaseous mixture within the at least one chamber during a compression cycle of the engine;
    controlling at least one of a volume and a pressure of the gaseous mixture as the at least one chamber rotates around the housing during the compression cycle using a compression control port, the compression control port including a passage in flow communication with the at least one chamber, and at least one valve disposed in the passage and configured to control a flow through the passage;
    combusting a fuel-air mixture within the at least one chamber; and
    discharging exhaust from the at least one chamber.

26. A method in accordance with claim 25, wherein compressing a gaseous mixture within the at least one chamber includes compressing the gaseous mixture after fuel is injected into the at least one chamber.

* * * * *